(No Model.)

G. ATKINSON.
LUBRICATOR FOR BOILER FEEDERS.

No. 549,224. Patented Nov. 5, 1895.

WITNESSES:
N. E. Eaton
E. H. Marsellus

INVENTOR
George Atkinson
BY
Howard L. Osgood
ATTORNEY

UNITED STATES PATENT OFFICE.

GEORGE ATKINSON, OF ROCHESTER, NEW YORK.

LUBRICATOR FOR BOILER-FEEDERS.

SPECIFICATION forming part of Letters Patent No. 549,224, dated November 5, 1895.

Application filed August 2, 1895. Serial No. 558,019. (No model.)

*To all whom it may concern:*

Be it known that I, GEORGE ATKINSON, a citizen of the United States, and a resident of the city of Rochester, in the county of Monroe, in the State of New York, have invented a certain new and useful Lubricator for Boiler-Feeders, of which the following is a specification, reference being had to the accompanying drawings, in which—

Figure 1:
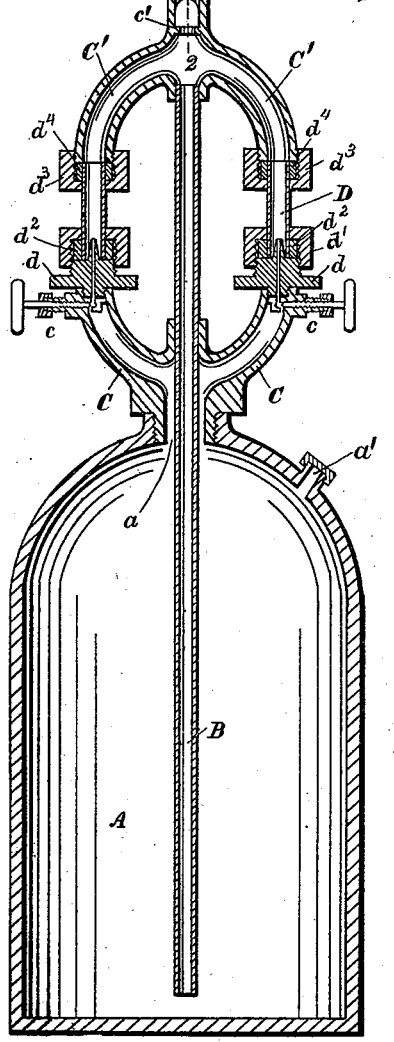
Figure 2:
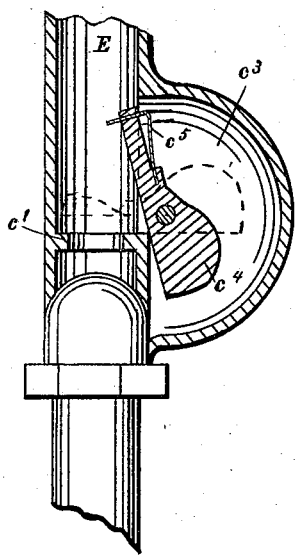
Figure 3:
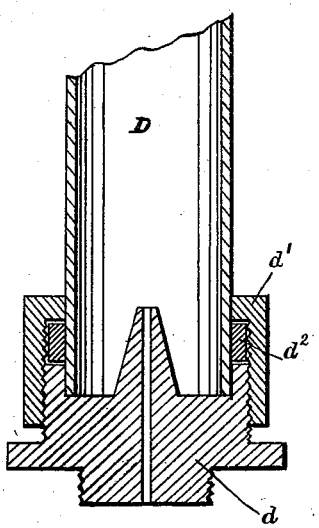

Figure 1 is a vertical section of my lubricator. Fig. 2 is an enlarged section on the line 2 2 of Fig. 1, and Fig. 3 is an enlarged view of the connection of the oil-duct with the sight-glass.

The object of my invention is to produce a simple and effective means of feeding oil by displacement in a single connection-lubricator, to provide a simple safety device therein, and an easy means of removing the sight-glasses.

My invention consists in the devices and combinations hereinafter set forth and claimed.

My device is especially intended for feeding coal-oil into boilers at the same time with the feed-water, in order to prevent the accumulation or production of scale in the boilers.

In the drawings, A represents the oil-tank, which may be filled through a suitable opening $a'$. A pipe B extends downward in said tank nearly to the bottom thereof. To the highest point of the tank is fixed a Y. Through a central opening $a$ in the stem of the Y the pipe B passes, with a connection on each side of the pipe to one of the branches C of the Y. The branches of the Y extend upward in gentle curves, and each has a valve $c$ therein for the regulation of the outflow of oil, as hereinafter explained. Upon the ends of the branches of the Y are fastened two oil-ducts $d$, which screw into the branches and are provided with flanges for the application of a wrench. A small central perforation passes through the axis of each duct. Upon the duct $d$ rests the sight-glass D, which is fastened to the duct by means of the threaded collar $d'$, which is adapted to compress the packing $d^2$ against the duct. The upper end of each sight-glass connects with a branch C' of an inverted Y, and the glass is connected thereto by means of the threaded collar $d^3$ and the packing $d^4$. The two branches C' of the upper Y unite in line with the pipe B, and the pipe extends water-tight from the union of the branches C of the lower Y to the union of the branches C' of the upper Y. In line with the pipe B is the pipe E, provided with the valve F, and connected by a T connection to the feed-water pipe G to the boiler. Immediately above the union of the branches C' of the upper Y is a valve-seat $c'$ in the pipe E. On one side of this valve-seat is the recess or bulb $c^3$, in which is pivoted a valve $c^4$, which is counterweighted so as normally to remain open, but is adapted to swing down to fit upon the seat $c'$ and to close the inlet to the lubricator. The edge of the valve $c^4$ normally extends somewhat into the pipe E, and it is provided with a spring $c^5$, which, when the valve closes upon its seat $c'$, is put under tension, so as to tend to throw the valve away from its seat by the spring pressing on the seat $c'$, as shown in dotted lines in Fig. 1.

The operation of my device is as follows: The tank A is properly filled with coal-oil. The feed-water from the pipe G is let into the lubricator by opening the valve F. The water-pressure is through the pipe E, through the branches C', sight-glasses D, ducts $d$, valves $c$, branches C, and opening $a$, and also through the pipe B. The water-pressure is therefore balanced throughout the device; but as soon as the valves $c$ are properly adjusted the oil, by reason of its lightness, will rise slowly through the openings $a$, valves $c$, ducts $d$, and so on, through the pipe E and into the feed-water pipe G and, mixing with the feed-water, will run into the boiler. As fast as the oil ascends from the tank A, an equal quantity of water will flow through the pipe B into the tank, but no more water can flow into the tank than is permitted by the outflow of oil, which is regulated by the valves $c$. The feed-water is often very hot, and in case a sight-glass should break, either by pressure or by change of temperature or from whatever cause, the oil would be forced rapidly out of the tank and liberally dispensed in the boiler-room, creating danger on account of the inflammability of the coal-oil. In order to obviate this danger, I provide the valve $c^4$ for the purpose now to be described.

As above stated, the valve $c^4$ normally is open, but its edge extends into the pipe E and therefore into the current of water, which flows downward into the tank A as fast as the oil flows out therefrom. Under the normal conditions this flow is so slow as not to disturb the position of the valve; but in case one of the sight-glasses should break there would be a sudden and rapid rush of water through the pipe E and through the branch C' leading to the broken glass. This rapid rush of water catches the edge of the valve $c^4$ and immediately forces the valve down upon its seat $c'$, thereby closing the way to the broken glass. When the engineer or attendant discovers that the glass is broken, he closes the valve F without danger of being scalded or of being deluged with oil. As soon as the glass is replaced, the device is ready for action, as the valve $c^4$ is thrown open by the spring $c^5$ as soon as the abnormal pressure of the feed-water is removed or reduced to or near normal. It is thus seen that my valve is automatic, both for closing and for opening, as the counterweight on the valve throws it wide open as soon as it moves from its seat. Any break in the tank or lubricator will lower the valve $c^4$ and is rendered harmless by this automatic valve.

It has been difficult in lubricators to provide simple and practical means for taking out the sight-glasses in order to clean them or to insert new ones, and an equal difficulty has been experienced in removing the nipples through which the oil is fed in order to clean them. In my device this is accomplished by unscrewing the collar $d'$ from the duct $d$, then loosening the collar $d'$ and then pushing up the glass D into the branch C'. The duct $d$ is then unscrewed from the branch C and when removed leaves a sufficient space to pull the glass D downward and out from the lubricator. The method of replacing the parts is so obvious as to require no further description. The sight-glass is seated in or on the duct $d$, and the duct may be threaded to be screwed into the branch C or outside of it.

The form and arrangement of the oil passages in my lubricator are such as to permit the free flow of the oil with perfect regulation thereof. The curves of the branches C and C', on account of the use of Y-pipes, are easy, and there are no sharp corners in any of the oil-passages to retain or retard the oil. The valve $c^4$ is normally wide open and does not impede the ascending oil. The valves $c$ are not essential.

It is obvious that a single sight-glass, one branch C and one branch C', may be used instead of the double form shown and described.

What I claim is—

1. In a single connection lubricator, the combination of an inlet pipe E, a tank A, a water pipe B in continuation of said inlet pipe and extending to or near the bottom of the tank A, a Y having one or more branches C and having a connection with said tank independent of said pipe B, an inverted Y having one or more branches C' connected to said pipe E, one or more sight glasses D D connecting said branches C and C' and capable of insertion into one of said branches, a packing collar $d^3$ on the branch into which said sight glass passes, an oil duct $d$ screwed upon the other branch with which said sight glass connects, and a collar $d'$ screwed upon said duct $d$ and encircling said sight glass.

2. In a single connection lubricator, the combination of an inlet pipe E, a tank A, a water pipe B in continuation of said inlet pipe and extending to or near the bottom of the tank A, a Y having one or more branches C and having a connection with said tank independent of said pipe B, an inverted Y having one or more branches C' connected to said pipe E, one or more sight glasses D D connecting said branches C and C' and capable of insertion into one of said branches, a packing collar $d^3$ on the branch into which said sight glass passes, an oil duct $d$ screwed upon the other branch with which said sight glass connects, a collar $d'$ screwed upon said duct $d$ and encircling said sight glass, a pivoted counterbalanced valve $c^4$ in said pipe E normally held wide open and extending slightly into said pipe and a valve seat $c'$ in said pipe E for said valve and a bulb $c^3$ for the counterbalancing portion of said valve.

3. The pivoted and counterbalanced valve $c^4$ normally held wide open by the counterbalance thereof and normally extending only slightly into the pipe E and inclosed in a suitable bulb $c^3$ extending from said pipe and the valve seat $c'$ in said pipe, whereby, when the normal current in said pipe is abnormally increased, the valve is thereby closed, but is automatically opened by the counterbalance of said valve when the pressure of the inlet current decreases to or near the normal.

4. The pivoted and counterbalanced valve $c^4$ normally held wide open by the counterbalance thereof and normally extending only slightly into the pipe E and inclosed in a suitable bulb $c^3$ extending from said pipe and the valve seat $c'$ in said pipe, the spring $c^5$ upon said valve adapted to engage the valve seat $c'$ and to be put under tension when the valve is forced upon the seat whereby, when the normal current in said pipe is abnormally increased, the valve is thereby closed, but is automatically opened by the spring and the counterbalance of said valve when the pressure of the inlet current decreases to or near the normal.

GEORGE ATKINSON.

Witnesses:
S. P. MOORE,
M. H. McMATH.